United States Patent
Koeda et al.

(10) Patent No.: US 8,051,976 B2
(45) Date of Patent: Nov. 8, 2011

(54) TRACK FRAME ASSEMBLY IN CONVEYOR SYSTEM

(75) Inventors: Motoya Koeda, Saitama (JP); Kazuyuki Kobayashi, Saitama (JP)

(73) Assignees: Tsubaki Yamakyu Chain Co., Ltd., Tokyo (JP); Tsubakimoto Chain Co., Osaka (JP)

( * ) Notice: Subject to any disclaimer, the term of this patent is extended or adjusted under 35 U.S.C. 154(b) by 347 days.

(21) Appl. No.: 12/374,496

(22) PCT Filed: Jul. 25, 2007

(86) PCT No.: PCT/JP2007/065033
§ 371 (c)(1),
(2), (4) Date: Jan. 21, 2009

(87) PCT Pub. No.: WO2008/023547
PCT Pub. Date: Feb. 28, 2008

(65) Prior Publication Data
US 2009/0260958 A1    Oct. 22, 2009

(30) Foreign Application Priority Data
Aug. 25, 2006 (JP) .................... 2006-228751

(51) Int. Cl.
*B65G 21/00* (2006.01)
(52) U.S. Cl. ..................... 198/860.1; 198/837
(58) Field of Classification Search ............. 198/837, 198/841, 860.1
See application file for complete search history.

(56) References Cited

U.S. PATENT DOCUMENTS

| | | | | |
|---|---|---|---|---|
| 2,990,940 A * | 7/1961 | Merchant | ....................... | 198/793 |
| 3,258,250 A * | 6/1966 | McMullin | ..................... | 256/13.1 |
| 3,265,192 A * | 8/1966 | Stadelman | .................... | 198/841 |
| 3,682,295 A * | 8/1972 | Roinestad | .................... | 198/833 |
| 3,800,938 A * | 4/1974 | Stone | ............................ | 198/841 |
| 3,825,108 A * | 7/1974 | Stone | ......................... | 198/861.1 |
| 3,834,513 A * | 9/1974 | Miura et al. | .................. | 198/332 |
| 4,438,842 A * | 3/1984 | Alldredge et al. | ............ | 198/838 |

(Continued)

FOREIGN PATENT DOCUMENTS

JP    58-152706    9/1983
(Continued)

OTHER PUBLICATIONS

English language Abstract of JP 2001-294315, Oct. 23, 2001.
(Continued)

*Primary Examiner* — Gene Crawford
*Assistant Examiner* — William R Harp
(74) *Attorney, Agent, or Firm* — Greenblum & Bernstein P.L.C.

(57) ABSTRACT

A track frame assembly is provided having a frame member formed from an elongated channel, a pair of track rail members each fixed in place on a predetermined surface of the frame member, and a plurality of rail fixtures with which the pair of track rail members can removably be fixed to the frame member. Each of the track rail members includes a retaining projection having a retaining recess, the retaining recesses of the track rail members are opposite each other and each chain element of the conveyor chain has a pair of engaging projections which are formed to slide in contact in the respective retaining recesses in the track rail members so that the conveyor chain can be move smoothly. Thus, the track frame assembly can be formed from a reduced number of parts and designed lightweight because of its structural simplicity.

6 Claims, 15 Drawing Sheets

U.S. PATENT DOCUMENTS

| | | | |
|---|---|---|---|
| 4,627,529 A | 12/1986 | Tarlton et al. | |
| 4,961,492 A * | 10/1990 | Wiseman et al. | 198/841 |
| 5,042,648 A | 8/1991 | Garvey | |
| 5,186,314 A * | 2/1993 | Clopton | 198/860.2 |
| 5,316,134 A * | 5/1994 | Donohue | 198/861.1 |
| 5,398,802 A * | 3/1995 | Clopton | 198/465.1 |
| 5,426,919 A * | 6/1995 | Natterer et al. | 53/559 |
| 5,489,020 A | 2/1996 | Clopton | |
| 5,782,340 A * | 7/1998 | Dolan | 198/841 |
| 5,971,137 A * | 10/1999 | Grant et al. | 198/782 |
| 6,059,097 A * | 5/2000 | Clopton | 198/852 |
| 6,131,724 A | 10/2000 | Hirasawatu et al. | |
| 6,279,729 B1 | 8/2001 | Simkowski | |
| 6,382,399 B2 | 5/2002 | Simkowski | |
| 6,427,830 B1 * | 8/2002 | Ciccorilli | 198/841 |
| 6,666,325 B1 * | 12/2003 | Buenning et al. | 198/782 |
| 6,962,249 B2 * | 11/2005 | Ludwig et al. | 198/345.3 |
| 7,765,767 B2 * | 8/2010 | Scholte | 52/749.1 |
| 2003/0029351 A1 | 2/2003 | Terajima et al. | |

FOREIGN PATENT DOCUMENTS

| | | |
|---|---|---|
| JP | 61-127511 | 6/1986 |
| JP | 2-103013 | 8/1990 |
| JP | 4-42111 | 4/1992 |
| JP | 4-274960 | 9/1992 |
| JP | 7-63204 | 3/1995 |
| JP | 8-337165 | 12/1996 |
| JP | 3035356 | 12/1996 |
| JP | 2001-310812 | 11/2001 |
| JP | 2003-54724 | 2/2003 |
| JP | 3498179 | 12/2003 |
| JP | 2004-203504 | 7/2004 |
| JP | 3584443 | 8/2004 |

OTHER PUBLICATIONS

English language Abstract of JP 2003-54724, Feb. 26, 2003.
English language Abstract of JP 7-63204, Mar. 7, 1995.
English language Abstract of JP 2-103013, Aug. 16, 1990.
English language Abstract of JP 2002-255327, Sep. 11, 2002.
English language Abstract of JP 2001-310812, Nov. 6, 2001.
English language Abstract of JP 4-42111, Apr. 9, 1992.
English language Abstract of JP 4-274960, Sep. 30, 1992.
English language Abstract of JP 61-127511, Jun. 14, 1986.

* cited by examiner

Fig.12
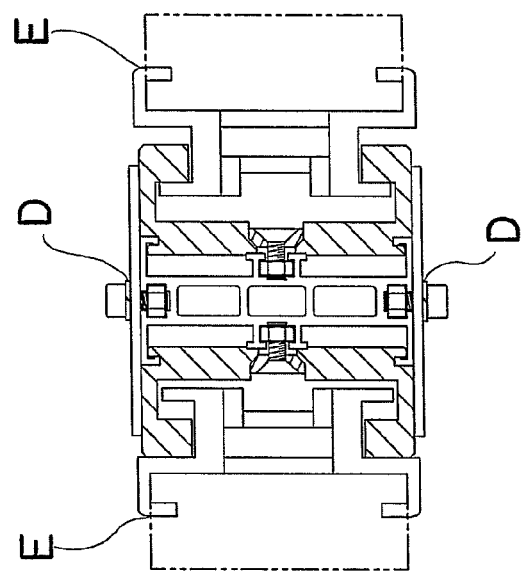
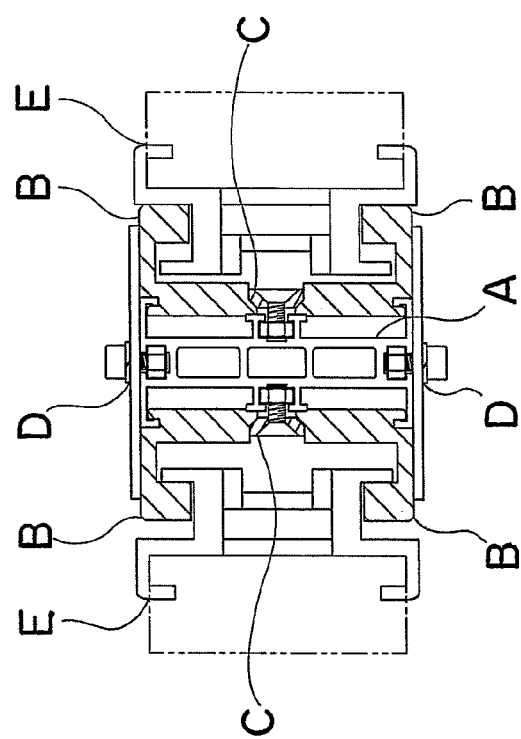

TRACK FRAME ASSEMBLY IN CONVEYOR SYSTEM

TECHNICAL FIELD

The present invention relates to a track frame assembly which can guide various types of conveyor chains used in the field of conveyor systems, for example, can be formed from a reduced number of parts and designed lightweight because of its structural simplicity, is easy to assemble, can retain ample strength and precision, is easy to handle and maintain and inexpensive.

BACKGROUND ART

A typical one of the track frame assemblies of this type for use in the conveyor systems is disclosed in the Japanese Patent No. 3498179 of the Applicant of the present invention, for example.

The track frame assembly is to be used with conveyor chains or the like used in the conveyor system. It includes a pair of metallic frame members and an appropriate number of coupling clamps which couple the pair of frame members together parallel and opposite to each other.

Each of the frame members is a generally elongated channel-like structure including an elongated base plate portion and elongated bent plate portions formed contiguous to the lateral sides (longer sides), respectively, of the base plate portion. The elongated base plate portion has a concavity formed to extend longitudinally. The concavity is formed to have a generally "dove-tail" cross section which is defined by a pair of elongated slant walls extending to the position of the bent plate portion and gradually more divergent as it goes toward the end of the longer side and an elongated back wall connecting the ends of the longer sides of the slant walls in pair to each other.

The elongated bent plate portion has formed at the end of the longer side thereof an elongated folded-back portion extending toward the base plate portion. Each of the coupling clamps includes a pair of clamps and a fastener capable of connecting the clamps toward each other. The concavity in each frame member is grasped at the back thereof by an engaging portion provided at either end of the clamps in pair.

However, the track frame assembly of the above-mentioned type is disadvantageous in that a time longer than expected is required for a high-precision assembling because the track frame assembly includes the pair of metallic frame members and appropriate number of clamps for coupling the pair of frame members to each other.

Also, the synthetic resin-made track rail is disadvantageous in that it is compatible with only a conveyor chain corresponding in shape to the frame member because it is installed to cover a part of the bent plate portion of the frame member and the folded-back portion.

That is, to make the conventional track frame assembly compatible with various types of conveyor chains, not only the track rail but the frame members have to be modified in shape and dimensions, which will disadvantageously add to the costs of the conveyor system using the track frame assembly. Also, since the track rail is installed to cover the folded-back portion, the engaging projection of the conveyor chain possibly slides in direct contact with a metallic guide and scatters abrasion-caused metal powder.

Furthermore, when the track rail and frame members are installed, it is difficult to assure ample strength of the installation. When the track rail is applied with a large external force, longitudinal misalignment will possibly be caused, resulting in lateral backlash.

DISCLOSURE OF THE INVENTION

It is therefore desirable to overcome the above-mentioned drawbacks of the related art by providing a conveyor-track frame assembly capable of guiding various types of conveyor chains used in the field of conveyor systems, which can be formed from a reduced number of parts and designed lightweight because of its structural simplicity, is easy to assemble, can retain ample strength and precision, is easy to handle and maintain and which can be produced and built with lower costs.

According to an embodiment of the present invention, there is provided a track frame assembly compatible with various types of conveyor chains E used in the field of conveyor systems to guide the conveyor chain stably, the assembly comprising, an elongated metallic frame member A formed by extrusion molding;

at least a pair of elongated synthetic resin-made track rail members B each fixed in place on a predetermined surface of the frame member A; and a plurality of rail fixtures C with which the pair of track rail members B can removably be fixed to the frame member A.

In the above track frame assembly, each of the track rail members B includes a retaining projection 13 having a retaining recess 13a formed therein, the pair of track rails B is disposed for the retaining recesses 13a to be opposite to each other and each chain element of the conveyor chain E has a pair of engaging projections 31 which are formed to slide in contact in the respective retaining recesses 13a in the track rail members B in pair, thus the conveyor chain E being smoothly movable without disengagement from the pair of track rail member B.

According to another embodiment of the present invention, there is provided a track frame assembly wherein the frame member A includes a body portion 1 having at least a flat surface As, a pair of outer projections formed on the flat surface, and at outer ends, of the body portion 1, and a pair of inner projections formed on the flat surface As of the body portion 1 and inside the outer projections, respectively.

Also in the above track frame assembly, the track rail member B includes a body portion 10, a wedging projection 11 formed inside the base end 10e of the base portion 10b, an engaging projection 12 formed outside the base end 10e of the base portion 10b, and a retaining projection 13 formed outside the outer end of the base portion 10b to have a generally C-shaped cross section.

Also in the above track frame assembly, the rail fixtures C are to be provided between the pair track rail members B to prevent the track rail members B in pair from moving toward each other and each of them includes a fixing plate 20 having a pair of slant faces 20b which are in close contact with a slant face 11a of the wedging projection 11, a bolt 21 to be inserted in a bolt hole 20a formed in the fixing plate 20, and a nut 22 to be received in a nut receiving recess 4 between the pair of inner projections and in which the end portion of the bolt 21 is to be driven.

When the fixing plate 20 is moved to the body portion 1 of the frame member A by tightening the bolt 21, the pair of slant faces 20b will press the respective slant faces 11a of the wedging projection 11 of each of the track rail members B and the pair of track rail members B be pressed to the body portion 1 and pair of outer projections, respectively, of the frame member A.

According to another embodiment of the present invention, there is provided a track frame assembly wherein the frame member A includes a body portion 1 having at least a flat surface As, a pair of outer projections formed on the flat surface As, and at outer ends, of the body portion 1 to have a generally L-shaped cross section, and a pair of inner projections formed on the flat surface As of the body portion 1 and inside the outer projections, respectively, to have a generally T-shaped cross section.

Also in the above track frame assembly, the track rail member B includes a body portion 10 that abuts a part of the outer projection of the frame member A, a wedging projection 11 formed inside the base end 10e of the base portion 10b to abut a part of the inner projection, an engaging projection 12 formed outside the base end 10e of the base portion 10b to abut a part of the outer projection, a retaining projection 13 formed outside the outer end of the base portion 10 to have a generally C-shaped cross section and abut a part of the outer projection, and an engaging step 10a which is in contact with and engaged on the corner, at the outer end, of the inner projection.

Also in the above track frame assembly, the rail fixtures C are to be provided between the pair track rail members B to prevent the track rail members B in pair from moving toward each other and each of them includes a fixing plate 20 having a pair of slant faces 20b which are in close contact with a slant face 11a of the wedging projection 11, a bolt 21 to be inserted in a bolt hole 20a formed in the fixing plate 20, and a nut 22 to be received in a nut receiving recess 4 between the pair of inner projections and in which the end portion of the bolt 21 is to be driven.

When the fixing plate 20 is moved to the body portion 1 of the frame member A by tightening the bolt 21, the pair of slant faces 20b will press the respective slant faces 11a of the wedging projection 11 of each of the track rail members B and the pair of track rail members B be pressed to the body portion 1 and pair of outer projections, respectively, of the frame member A.

According to another embodiment of the present invention, there is provided a track frame assembly wherein the frame member A has formed therein a fixing concavity 1a in which an appropriate supporting means D can be fixed and an appropriate lightening cavity 1b.

Therefore, the track frame assembly 1 can be formed from a reduced number of parts and designed lightweight because of its structural simplicity, is easy to assemble, can retain ample strength and precision, is highly durable, is easy to handle and maintain and is inexpensive. In addition, the conveyor chain E can be moved on the track frame assembly with less noise, which will assure a calm working environment. Also, an engaging projection 31 of the conveyor chain E is not in contact with the frame member A, so that no abrasion-caused metal powder will possibly be scattered as in the conventional track frame assemblies.

Among others, since the track rail B can easily be replaced, various types of the conveyor chains E used in the field of conveyor systems are simply compatible with the track frame assembly according to the present invention. Thus, the track frame assemblies according to the present invention can freely and easily be used in appropriate combination correspondingly to an intended application.

Further, since the frame member A and track rail member B can be produced by extrusion molding easily and highly precisely, the track frame assembly according to the present invention is produced at considerably lower costs.

In the track frame assembly according to the present invention, each of the track rail members B in pair includes the retaining projections 13 having the retaining recess 13a formed therein, the track rail members B in pair are disposed for their retaining recesses 13a to be opposite to each other and the paired engaging projections 31 of each chain element of the conveyor chain E are formed for sliding in contact in the retaining recesses 13a of the track rail members B in pair so that the conveyor chain E can smoothly slide without disengagement from the pair of track rail members B. Thus, the track frame assembly according to the present invention can be laid freely and appropriately. The track frame assembly has a higher degree of freedom and is easier to use.

In the track frame assembly, the frame member A, track rail member B and rail fixture C may be simplified in structure, so that the track frame assembly can be lightened more easily, is easier to assemble and can retain an ample strength and precision.

When the fixing plate 20 is moved to the body portion 1 of the frame member A by tightening the bolt 21, the pair of slant faces 20b will press the respective slant faces 11a of the wedging projection 11 of each of the track rail members B and the pair of track rail members B be pressed to the body portion 1 and pair of outer projections, respectively, of the frame member A. Therefore, the track rail member B can fixed to the frame member A easily, quickly, positively, stably and securely. In addition, when the track rail member B is applied with a large external force, no misalignment with the frame member A will possibly be caused longitudinally. Also, no lateral backlash will possibly be caused.

Further, the frame member A includes a body portion 1 having at least a flat surface As, a pair of outer projections formed on the flat surface As, and at outer ends, of the body portion 1, and a pair of inner projections formed on the flat surface As of the body portion 1 and inside the outer projections, respectively;

the track rail member B includes a body portion 10, a wedging projection 11 formed inside the base end 10e of the base portion 10b, an engaging projection 12 formed outside the base end 10e of the base portion 10b, and a retaining projection 13 formed outside the outer end of the base portion 10b to have a generally C-shaped cross section; and the rail fixtures C are to be provided between the pair track rail members B to prevent the track rail members B in pair from moving toward each other and each of them includes a fixing plate 20 having a pair of slant faces 20b which are in close contact with a slant face 11a of the wedging projection 11, a bolt 21 to be inserted in a bolt hole 20a formed in the fixing plate 20, and a nut 22 to be received in a nut receiving recess 4 between the pair of inner projections and in which the end portion of the bolt 21 is to be driven. Therefore, by driving the bolt 21 of the rail fixture C, the track rail member B can be fixed to the frame member A accurately and quickly.

It should be noted that the fixing plates 20 each with the bolt 21 can be relocated longitudinally of the frame member A and a number and positioning of the fixing plates 20 disposed along the length of the track rail member B can freely be selected correspondingly to a weight applied to the track rail member B.

In the track frame assembly, the frame member A, track rail member B and rail fixture C may be simplified in structure, so that the track frame assembly can be lightened more easily, is easier to assemble and can retain an ample strength and precision.

When the fixing plate 20 is moved to the body portion 1 of the frame member A by tightening the bolt 21, the pair of slant faces 20b will press the respective slant faces 11a of the wedging projection 11 of each of the track rail members B and the pair of track rail members B be pressed to the body portion 1 and pair of outer projections, respectively, of the frame member A. Therefore, the track rail member B can fixed to the frame member A easily, quickly, positively, stably and securely. In addition, when the track rail member B is applied with a large external force, no misalignment with the frame member A will possibly be caused longitudinally. Also, no lateral backlash will possibly be caused.

Further, the frame member A includes a body portion 1 having at least a flat surface As, a pair of outer projections formed on the flat surface As, and at outer ends, of the body portion 1 to have a generally L-shaped cross section, and a pair of inner projections formed on the flat surface As of the body portion 1 and inside the outer projections, respectively, to have a generally T-shaped cross section;

the track rail member B includes a body portion 10 that abuts a part of the outer projection of the frame member A, a wedging projection 11 formed inside the base end 10e of the base portion 10b to abut a part of the inner projection, an engaging projection 12 formed outside the base end 10e of the base portion 10b to abut a part of the outer projection, a retaining projection 13 formed outside the outer end of the base portion 10b to have a generally C-shaped cross section and abut a part of the outer projection, and an engaging step 10a which is in contact with and engaged on the corner, at the outer end, of the inner projection; and the rail fixtures C are to be provided between the pair track rail members B to prevent the track rail members B in pair from moving toward each other and each of them includes a fixing plate 20 having a pair of slant faces 20b which are in close contact with a slant face 11a of the wedging projection 11, a bolt 21 to be inserted in a bolt hole 20a formed in the fixing plate 20, and a nut 22 to be received in a nut receiving recess 4 between the pair of inner projections and in which the end portion of the bolt 21 is to be driven. Therefore, by driving the bolt 21 of the rail fixture C, the track rail member B can be fixed to the frame member A accurately and quickly.

In addition, the track rail member B can be installed to the frame member A more stably with the body portion 10, wedging projection 11, engaging projection 12, retaining projection 13, engaging step 10a, etc.

It should be noted that the fixing plates 20 each with the bolt 21 can be relocated longitudinally of the frame member A and a number and positioning of the fixing plates 20 disposed along the length of the track rail member B can freely be selected correspondingly to a weight applied to the track rail member B.

In the track frame assembly, since the frame member A has formed therein the fixing concavity 1a in which the appropriate supporting means D can be fixed, the frame member A can be fixed to the supporting means D easily and positively.

Further, the appropriate lightening space 1b assures further lightening of the frame A and lower costs of the frame member A.

The foregoing and other features, aspects and advantages of the present invention will become more apparent from the following detailed description of embodiments of the present invention when taken in conjunction with the accompanying drawings. It should be noted that the present invention is not limited to the embodiments but can freely be modified without departing from the scope and spirit thereof.

BRIEF DESCRIPTION OF THE DRAWINGS

FIG. 12 is a partially cut-away front view of another embodiment of the conveyor-track frame assembly according to the present invention.

BEST MODE FOR CARRYING OUT THE INVENTION

Figure 1:
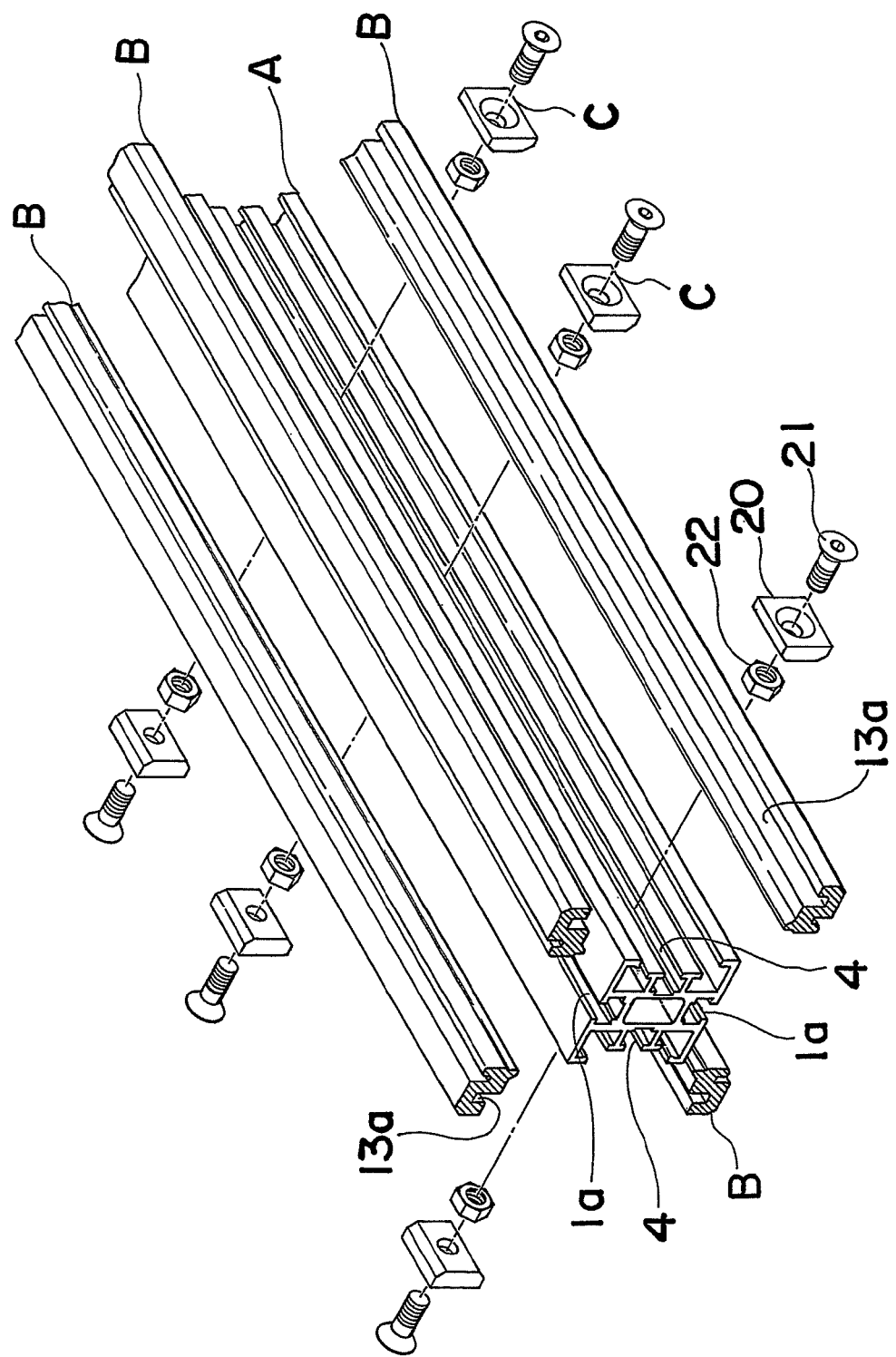
FIG. 1 is an exploded perspective view showing a part of the conveyor-track frame assembly according to the present invention as an example.
Figure 2:
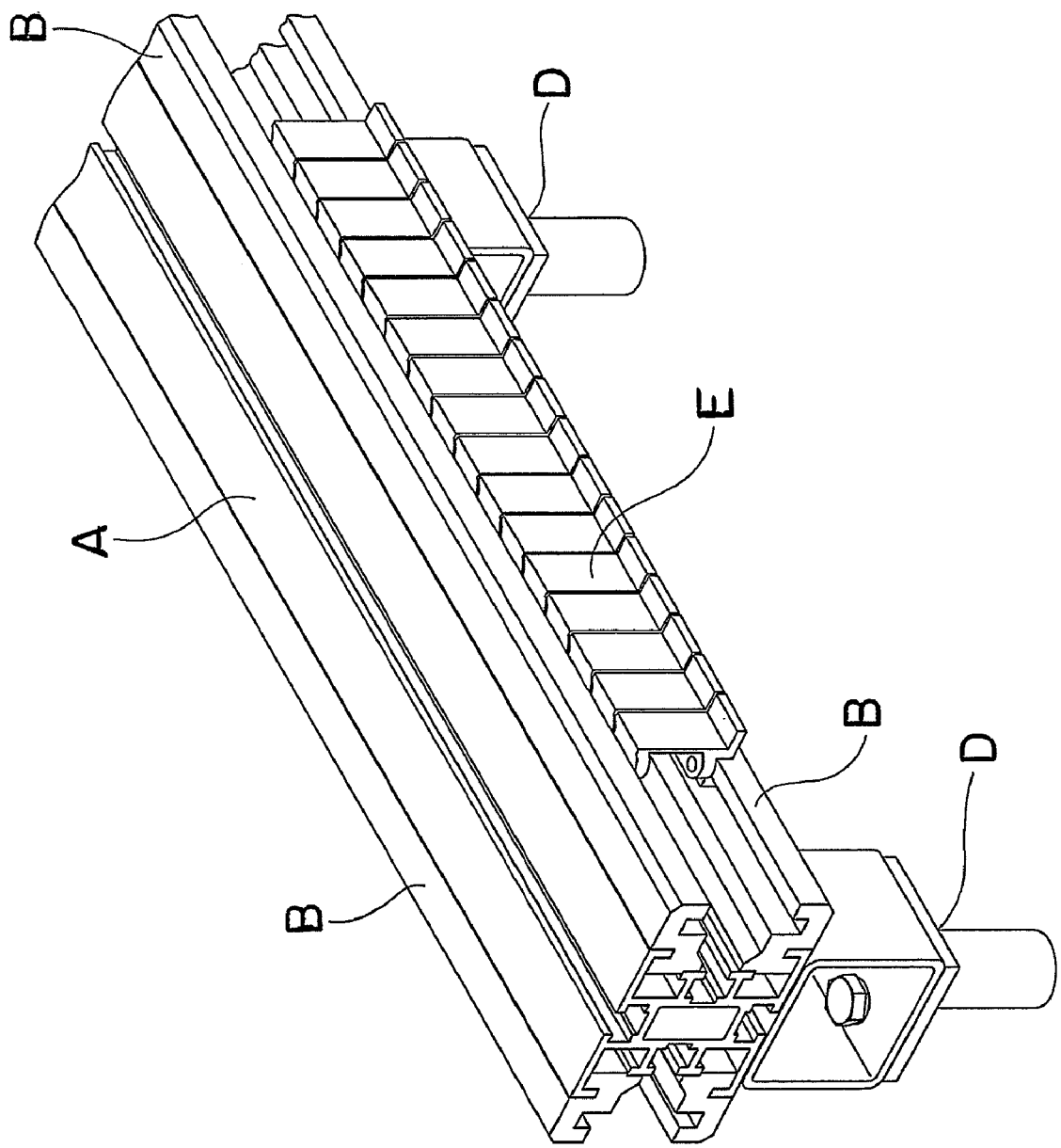
FIG. 2 is a perspective view showing a part of the conveyor-track frame assembly according to the present invention.
Figure 3:
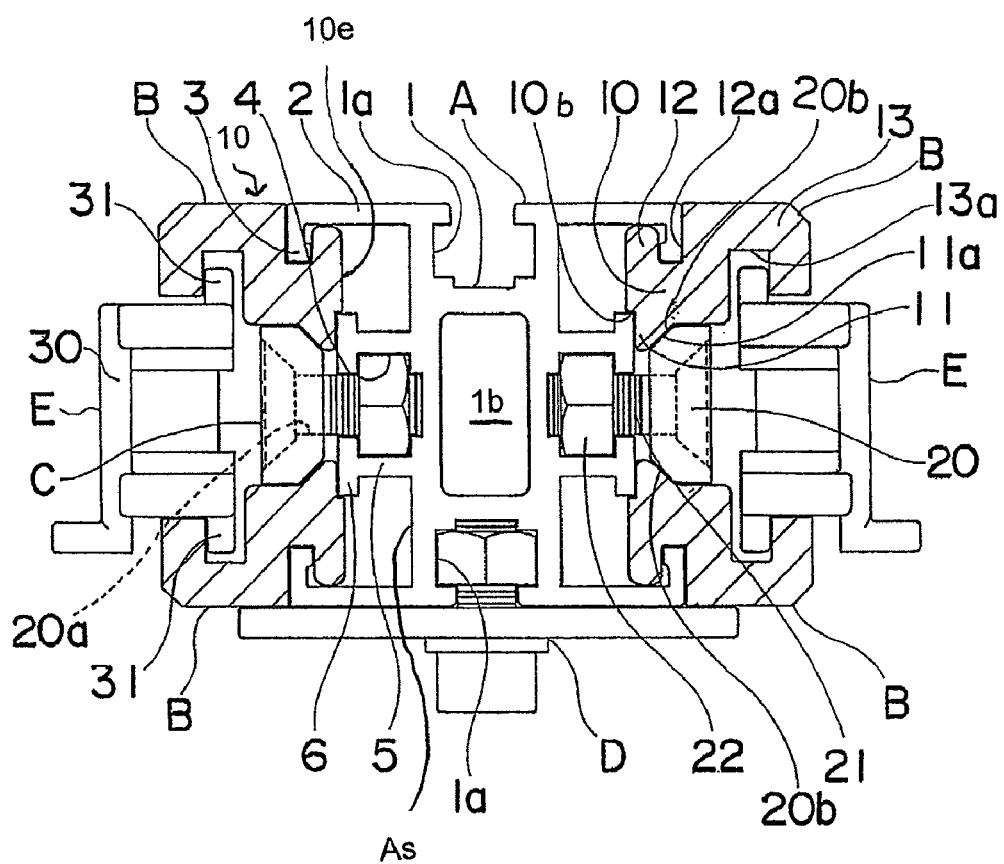
FIG. 3 is a partially cut-away front view of an embodiment of the conveyor-track frame assembly according to the present invention.
Figure 4:
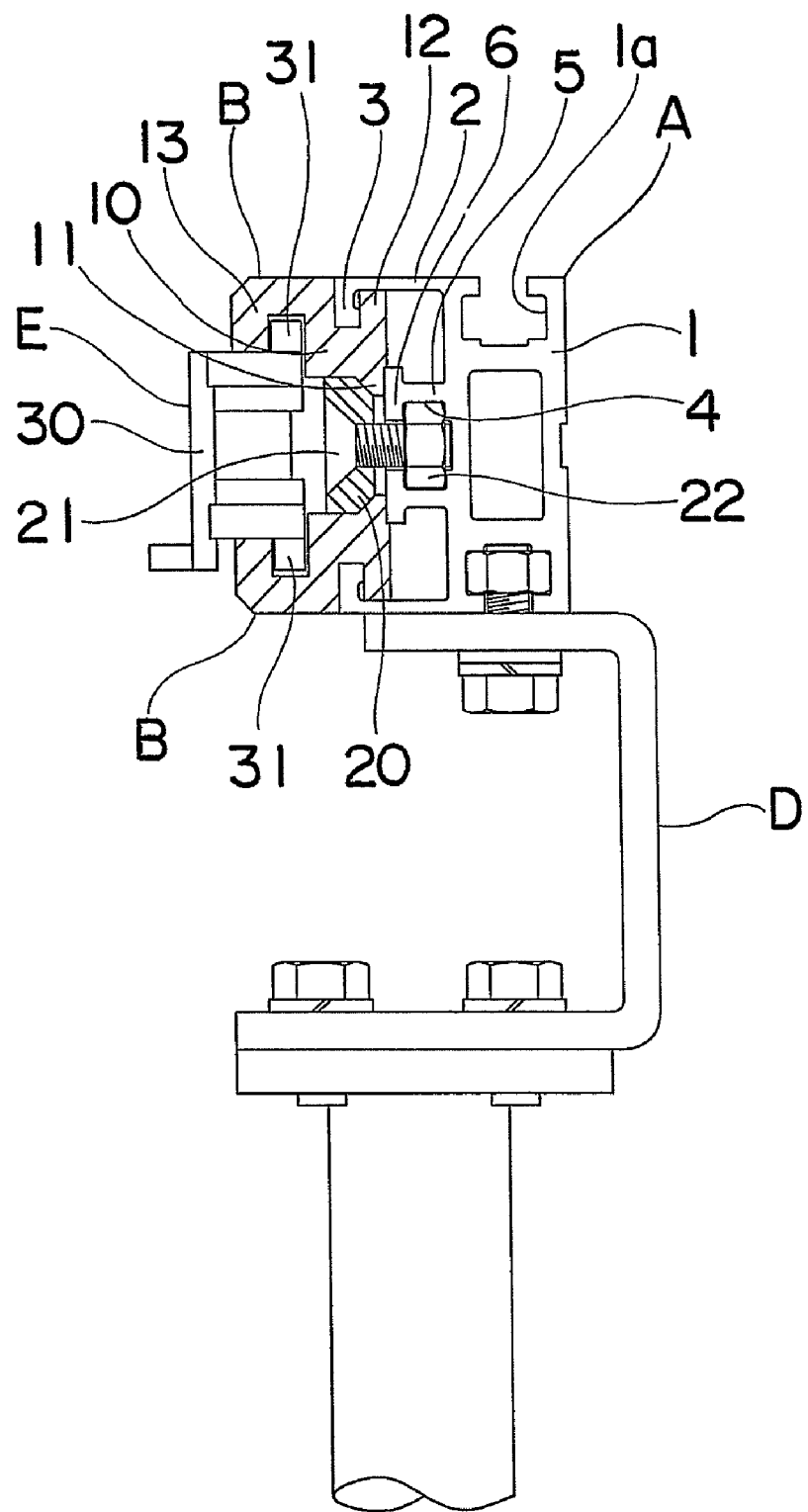
FIG. 4 is a partially cut-away front view of another embodiment of the conveyor-track frame assembly according to the present invention.

The present invention will be described in detail below concerning the embodiments thereof illustrated by way of example in the accompanying drawings.

As shown, the track frame assembly according to the present invention can be designed correspondingly to the type of a conveyor chain E used in the field of conveyor systems to guide the conveyor chain smoothly and stably.

More particularly, the track frame assembly according to the present invention includes an elongated frame member A formed by extrusion molding of a metal, at least a pair of elongated track rail members B formed by extrusion molding of a synthetic resin and each of which is to be fixed in place on a predetermined side of the frame member A, and a plurality of rail fixtures C by which the pair of track rail members B can removably be fixed to the frame member A.

Further, each of the track rail members B in pair has a retaining projection 13 having a retaining recess 13a formed therein. The track rail members B in pair are disposed for the retaining recesses 13a to be opposite to each other. Each element of the conveyor chain E has a pair of engaging projections 31 which slide in the retaining recesses 13a of the track rail members B in pair. Thus, the conveyor chain E can move smoothly without being disengaged from the pair of track rail members B.

In addition, the frame member A includes a body portion 1 having at least a flat surface As, a pair of outer projections formed integrally in outer areas, respectively, of the flat surface As of the body portion 1 to have a generally L-shaped section, and a pair of inner projections formed integrally in a central area of the flat surface As of the body portion 1 to have a generally T-shaped section.

The track rail member B includes a base portion 10b abutting a part of the outer projection and a part of the inner part of the inner projection, of the frame member A, a wedging projection 11 formed inside the base 10e of the base portion 10b and abutting a part of the outer projection, an engaging projection 12 formed outside the base 10e of the base portion 10b and abutting a part of the outer projection, and a retaining projection 13 formed outside the end 10b of the base portion 10b to have a generally C-shaped section and abutting a part of the outer projection.

Each of the rail fixtures C includes a fixing plate 20 formed between the track rail members B in pair to prevent the track rail members B from moving closer to each other and having a pair of slant faces 20b which are to be in close contact with slant faces 11a formed on the wedging projection 11, a bolt 21 to be inserted into a bolt hole 20a formed in the fixing plate 20, and a nut 22 to be received into the nut receiving recess 4 between the pair of inner projections and in which the end portion of the bolt 21 is to be driven. When the fixing plate 20 is moved toward the body portion 1 of the frame member A by driving the bolt 21, the pair of slat faces 20b press the slant faces 11a, respectively, of the wedging projections 11 of track rail members B in pair and thus the pair of track rail members B is pressed to the body portion 1 of the frame member A and pair of outer projections.

The frame member A further has formed therein a fixing concavity 1a in which an appropriate supporting means D can be fixed and an appropriate lightening cavity 1b.

EMBODIMENTS

The frame member A is formed elongated by extrusion molding of an appropriate metallic material, for example, to have an ample strength, rigidity and a reduced weight.

The frame member A includes a body portion 1 having at least a flat surface As, a pair of outer projections formed integrally in outer areas, respectively, of the flat surface As of the body portion 1 to have a generally L-shaped section, and a pair of inner projections formed integrally in a central area of the flat surface As of the body portion 1 to have a generally T-shaped section. Further, in a portion of the body portion 1 other than the flat surface As, there is formed a fixing concavity 1a in which the appropriate supporting means D can be fixed. In addition, the body portion 1 has an appropriate number of appropriate lightening spaces 1b formed therein to lighten the body portion 1.

The body portion 1 has a generally rectangular frame-shaped cross section, for example. It has a flat surface or two parallel flat surfaces. The appropriate number of generally recessed-shaped fixing concavities 1a is provided in other than the flat surface. In the middle of the body portion 1, there is formed such an appropriate number of lightening spaces 1b that will not lessen the strength and rigidity of the body portion 1. Thus, the body portion 1 is lightened.

In the frame member A, the outer projection includes, for example, an overhanging portion 2 formed integrally on either outer end of the flat surface As of the body portion 1 and generally perpendicular to the flat surface As, and a bent portion 3 contiguous to the end of the overhanging portion 2 and generally parallel to the flat surface As. Thus, the outer projection has a generally L-shaped section. The outer projections in pair formed integrally on either end of the flat surface As of the body portion 1 are symmetrical with respect to a line passing perpendicularly through the center of the flat surface As of the body portion 1.

The inner projections in pair are formed integrally in a nearly central area of the flat surface As of the body portion 1 at an appropriate interval, for example. Each of them includes a projection 5 generally perpendicular to the flat surface As and shorter than the overhanging portion 2 and an engaging portion 6 formed integrally on the end of the projection 5 and generally parallel to the flat surface As. Thus the inner projection has a generally T-shaped section. The inner projections in pair formed in the central area of the flat surface As of the body portion 1 are symmetrical with respect to the line passing perpendicularly through the center of the flat surface As of the body portion 1.

The track rail member B is formed elongated by extrusion molding of an appropriate synthetic resin, for example, to have a required strength, durability, etc. and a reduced weight.

The track rail member B includes a base portion 10b abutting a part (end of the bent portion 3) of the outer projection and a part (outer end of the engaging portion 6) of the inner part of the inner projection, of the frame member A, a wedging projection 11 formed inside the base of the base portion 10b and abutting a part (surface of the engaging portion 6, apart from the body portion 1) of the outer projection, an engaging projection 12 formed outside the base of the base portion 10b and abutting a part (inner side face of the overhanging portion 2 and inner side face of the bent portion 3) of the outer projection, and a retaining projection 13 formed outside the end of the base portion 10b to have a generally C-shaped section and abutting a part (outer side face of the bent portion 3) of the outer projection.

That is, the track rail member B is formed to be immobilized by the outer and outer projections of the frame member A and the fixing plate 20 of the rail fixture C.

Also an engaging step 10a is formed on a portion of the base portion 10b which is to be in contact with the inner projection of the body portion 1. The engaging portion 10a is formed to engage on the outer corner of the engaging portion 6 in order to increase the immobilization (stability of fixation) of the latter.

The wedging projection 11 is formed to have a generally triangular section, for example, so that the surface thereof parallel to the flat surface As of the body portion 1 will abut a surface of the engaging portion 6, apart from the body portion 1 and the slant face 11a will be slanted with respect to the flat surface As of the body portion 1. That is to say, when the slant face 11a is pressed, there will occur a force under which the wedging projection 11 will be moved toward the flat surface As of the body portion 1 and a force under which the wedging projection 11 will be moved toward the outer projection, whereby the track rail member B can be securely fixed to the frame member A.

The reference numeral 12a in the drawing indicates a recess defined by a part of the base portion 10b, engaging projection 12 and a part of the retaining projection 13 and in which the bent portion 3 is to be received. The bent portion receiving recess 12a is formed to hold the bent portion 3 of the outer projection of the frame member A from three directions.

The retaining projection 13 is formed for a pair of engaging projections 31 provided on each element of the appropriate conveyor chain E to be movable while being retained as well as for a part of the conveyor chain E to stably and smoothly be in contact with the retaining projection 13. It has a retaining recess 13a formed inside it. The track rail members B in pair are disposed for the retaining recesses 13a face each other so that the engaging projection 31 of the conveyor chain E can move smoothly sliding in the pair of retaining recesses 13a of the pair of track rail members B and the conveyor chain E will not be disengaged from the pair of track rail members B.

Each of the rail fixtures C includes, for example, a thick, generally rectangular fixing plate 20 to be interposed between the track rail members B in pair to prevent the track rail members B from moving closer to each other, a generally rectangular socket bolt 21 to be inserted into a bolt hole 20a formed in the center of the fixing plate 20, and a nut 22 to be received into the nut receiving recess 4 between the pair of inner projections (projection 5 and engaging portion 6) and in which the end portion of the bolt 21 is to be driven. The fixing plate 20 has formed thereon a pair of slant faces 20b that are in close contact with the slant faces 11a of the wedging projection 11. When the bolt 21 is driven, the fixing plate 20 is moved toward the body portion 1 of the frame member A, the slant faces 20b in pair press the slant faces 11a, respectively, of the wedging projections 11 of track rail members B in pair and the pair of track rail members B is pressed to the body portion 1 of the frame member A and pair of outer projections. Thus the track rail members B are fixed.

Figure 13:
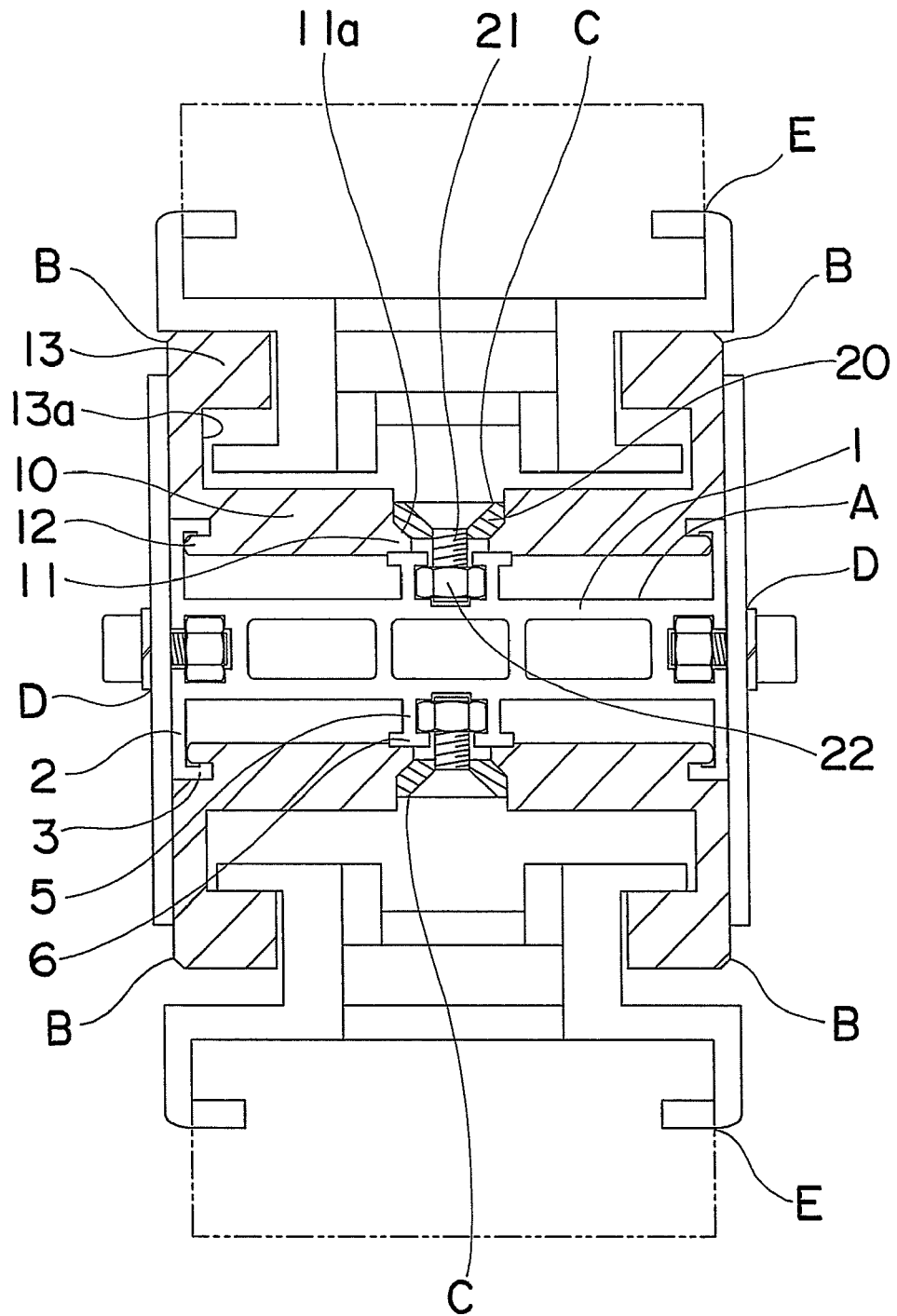
FIG. 13 is a partially cut-away front view of another embodiment of the conveyor-track frame assembly according to the present invention.
Figure 14:
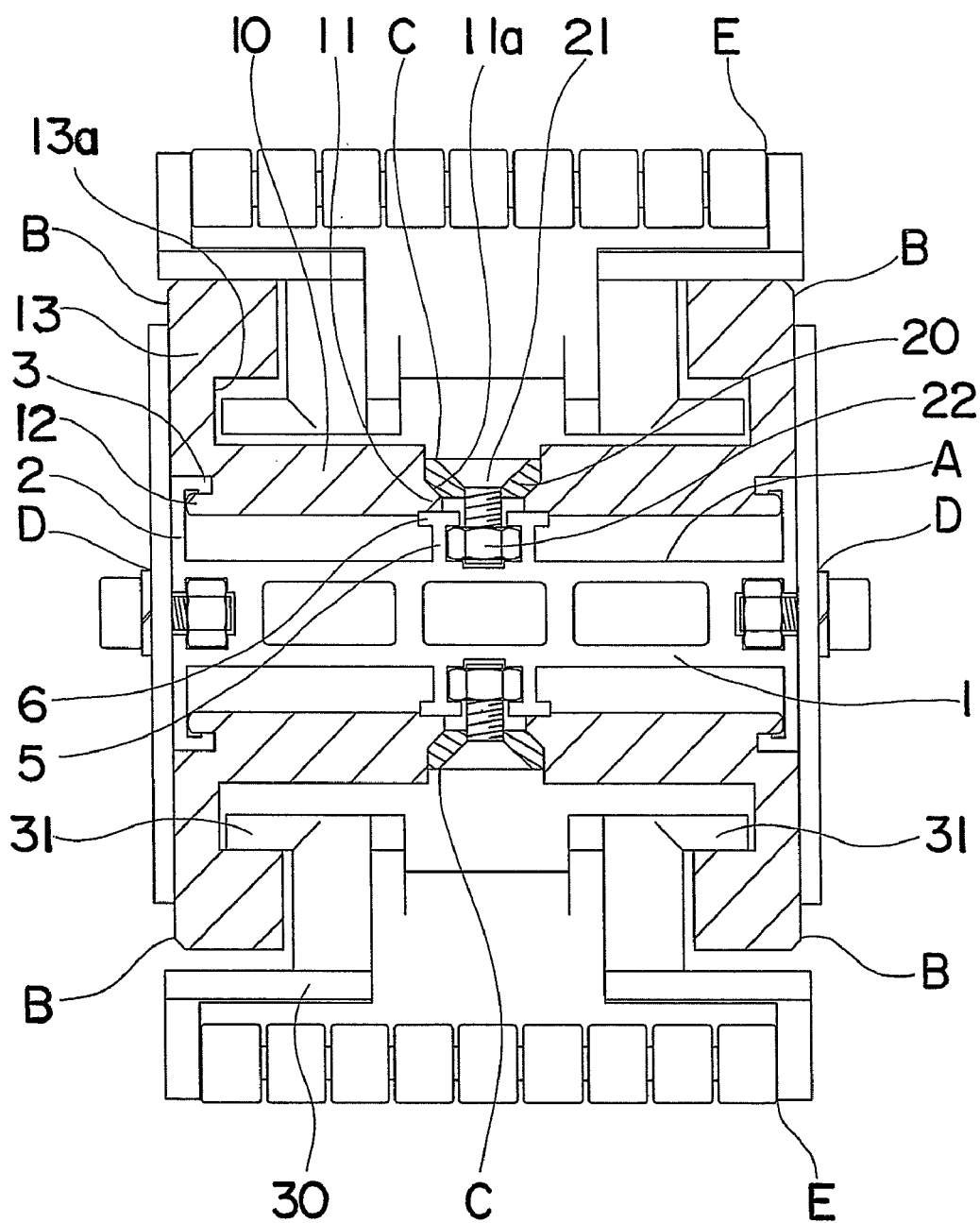
FIG. 14 is a partially cut-away front view of another embodiment of the conveyor-track frame assembly according to the present invention.
Figure 15:
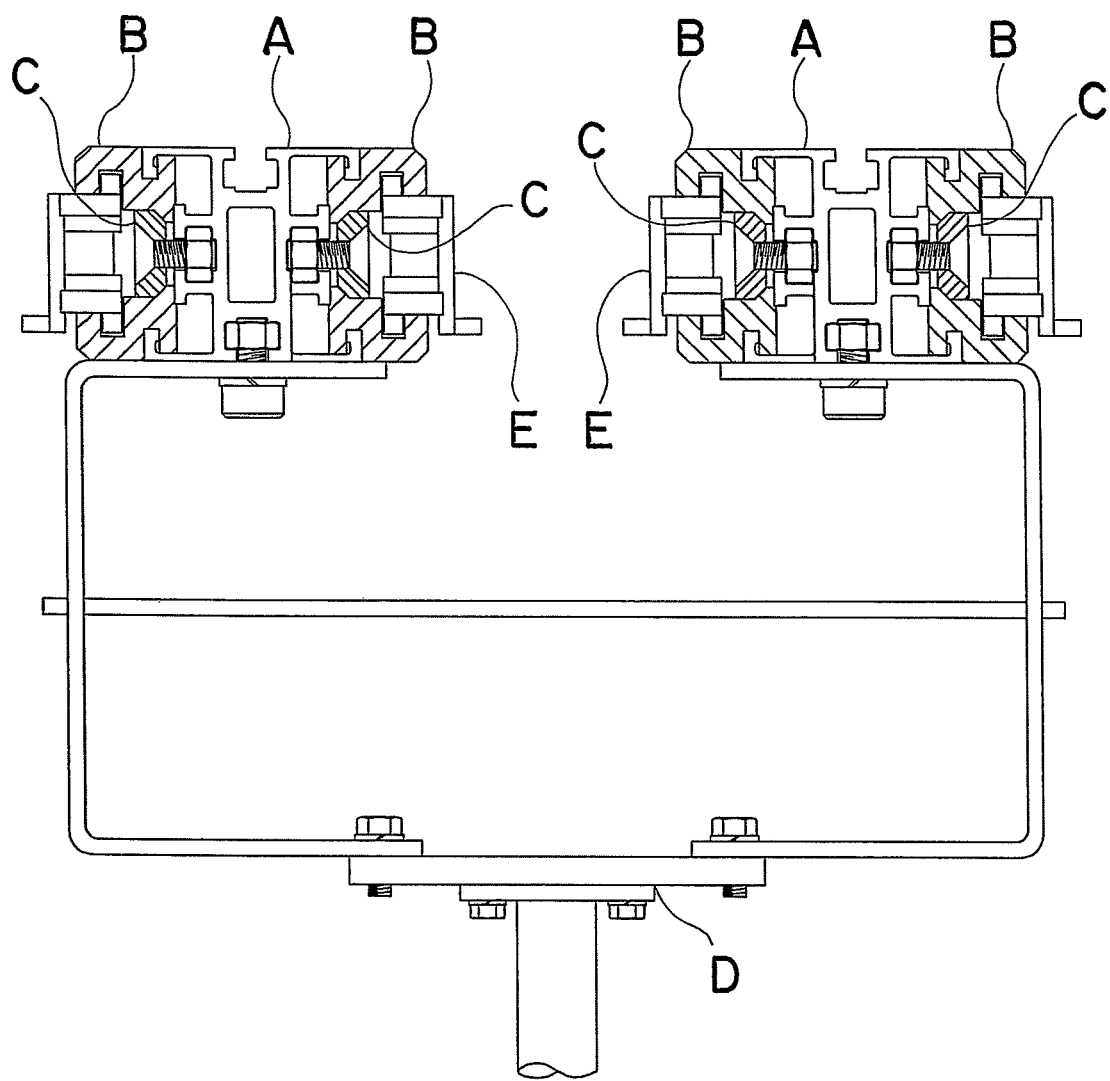
FIG. 15 is a partially cut-away front view of another embodiment of the conveyor-track frame assembly according to the present invention.

The supporting means D may be any one of those shown in FIGS. 2 and 9, FIG. 3, FIGS. 4 and 8, FIGS. 5 and 10, FIG. 6 and FIG. 7. An example of the supporting means D shown in FIGS. 2 and 9 includes an appropriate supporting column, a rectangular plate fixed to the upper end of the supporting column and a square frame connected to the square plate. The frame member A is fixed to the top of the square frame with a bolt and nut. Another example of the supporting means D shown in FIG. 3 includes a large rectangular receiving plate wider than the frame member A and capable of receiving the frame member A while being in contact with a part of the track rail member B. The frame member A is fixed to the top of the receiving plate with a bolt being driven in a nut received in the fixing concavity 1a of the frame member A. Another example of the supporting means D shown in FIGS. 4 and 8 includes a square plate fixed to the upper end of an appropriate supporting column and a laterally directed channel connected to the square plate with bolts. The frame member A is fixed to the channel with a bolt and nut. Another example of the supporting mean D shown in FIGS. 5 and 10 includes an appropriate supporting column, a rectangular plate fixed to the upper end of the supporting member and a channel connected to the top of the rectangular plate with bolts while being laid upwardly open. The fixing concavities 1a of the frame member A are fixed to the right and left upper ends, respectively, of the channel with bolts and nuts. Another example of the supporting means D shown in FIG. 6 includes an appropriate supporting column, a rectangular plate fixed to the upper end of the supporting column and a channel formed to have a generally L-shaped section and connected to the upper end of the channel with bolts. The frame member A is fixed at the fixing concavity 1a thereof to the upper end of the channel with bolts and nuts. Another example of the supporting means D shown in FIG. 7 includes an appropriate supporting column, a rectangular plate fixed to the upper end of the supporting column and a short cylindrical member connected to the rectangular plate with bolts. The frame member A is fixed to the top of the rectangular plate with a bolt being driven in an inner threaded hole formed in the flat surface As. Further, as shown in FIGS. 11, 12, 13 and 14, the receiving plate may be fixed to the fixing concavities 1a of the frame member A with the bolts and nuts to support the receiving plate by an appropriate supporting means. Otherwise, the rectangular plate is fixed to the upper end of the appropriate supporting column, the laterally directed channels be connected to the right and left ends, respectively, of the rectangular plate with bolts and the fixing concavities 1a of the frame member A be fixed to the right and left channels, respectively, as shown in FIG. 15. Another appropriate means may freely be selected to support the frame member A.

The conveyor chain E includes, for example, appropriately designed chain elements 30 and a plurality of engaging projections 31 provided on each chain element 30. The chain element 30 is slidable in place on the track rail member B and the engaging projection 31 is slidable in the retaining recess 13a of the track rail member B.

Figure 5:
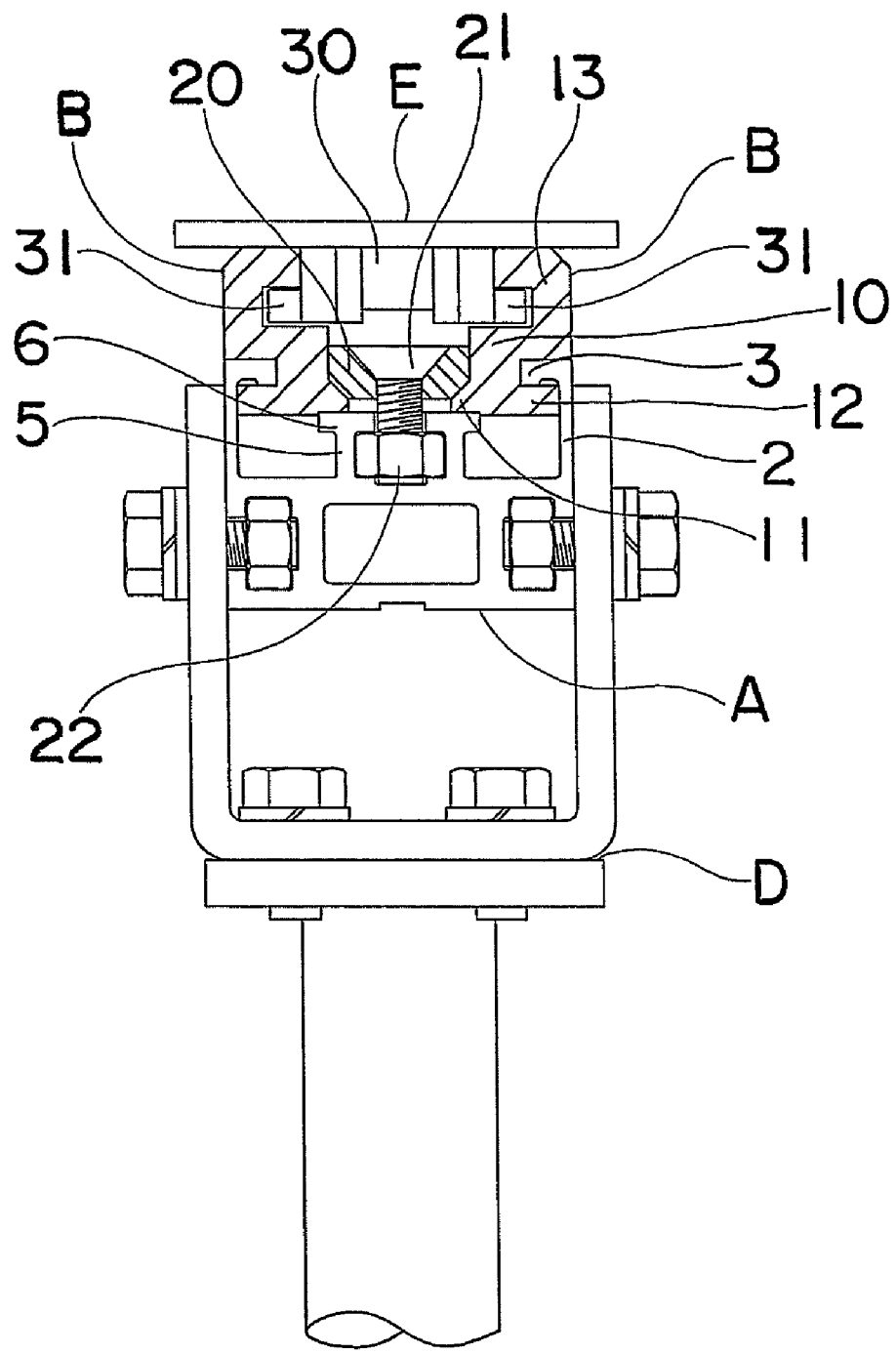
FIG. 5 is a partially cut-away front view of another embodiment of the conveyor-track frame assembly according to the present invention.
Figure 6:
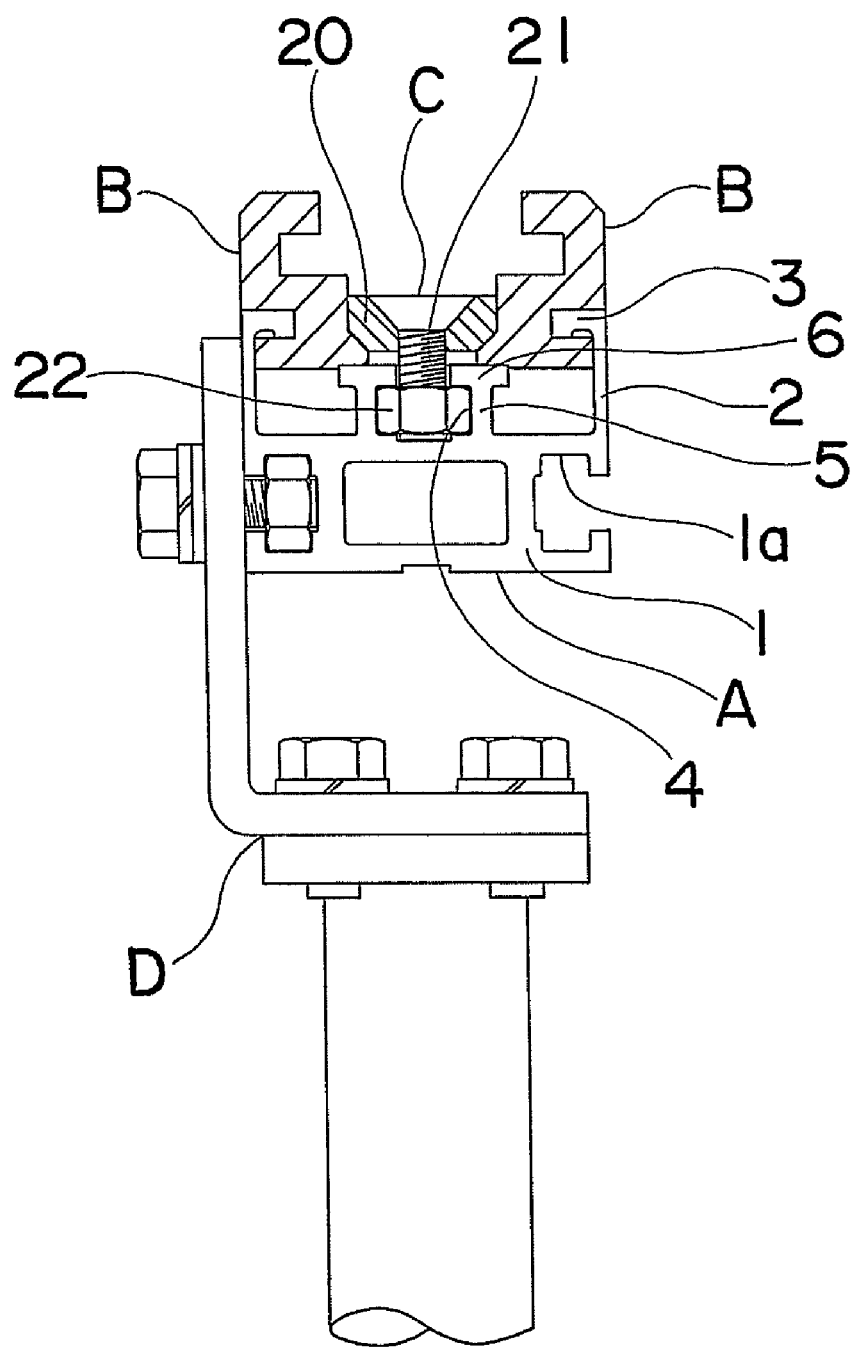
FIG. 6 is a partially cut-away front view of another embodiment of the conveyor-track frame assembly according to the present invention.
Figure 7:
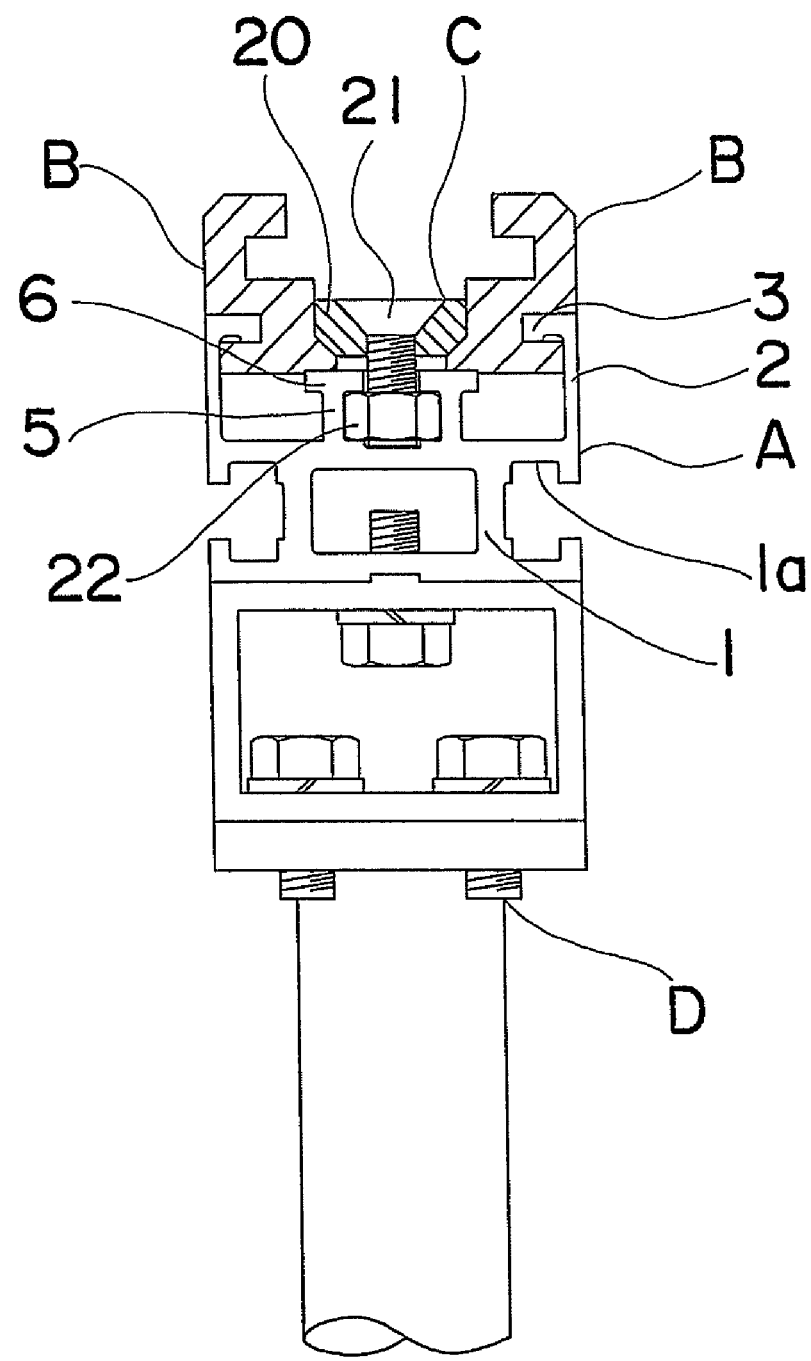
FIG. 7 is a partially cut-away front view of another embodiment of the conveyor-track frame assembly according to the present invention.
Figure 8:
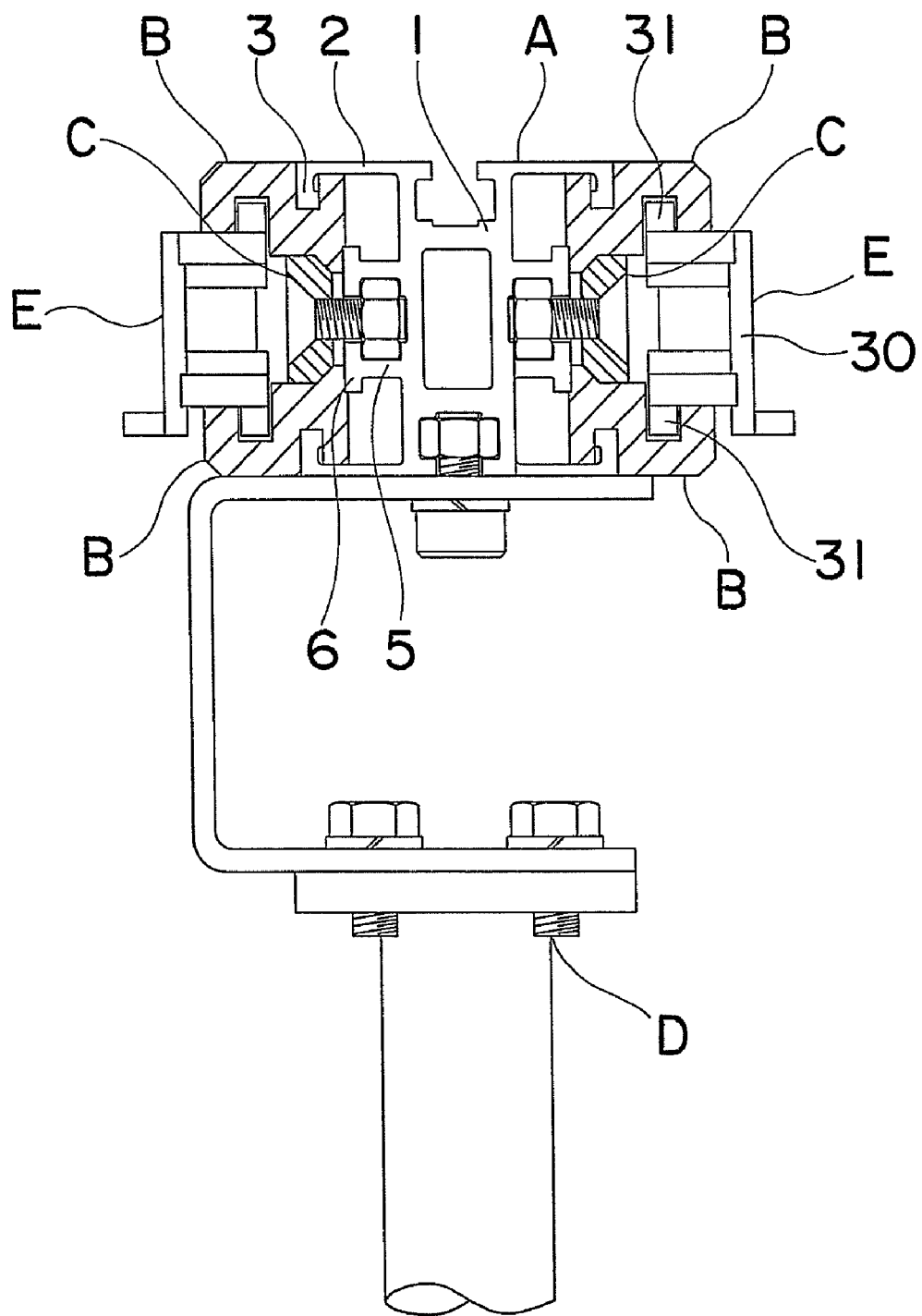
FIG. 8 is a partially cut-away front view of another embodiment of the conveyor-track frame assembly according to the present invention.
Figure 9:
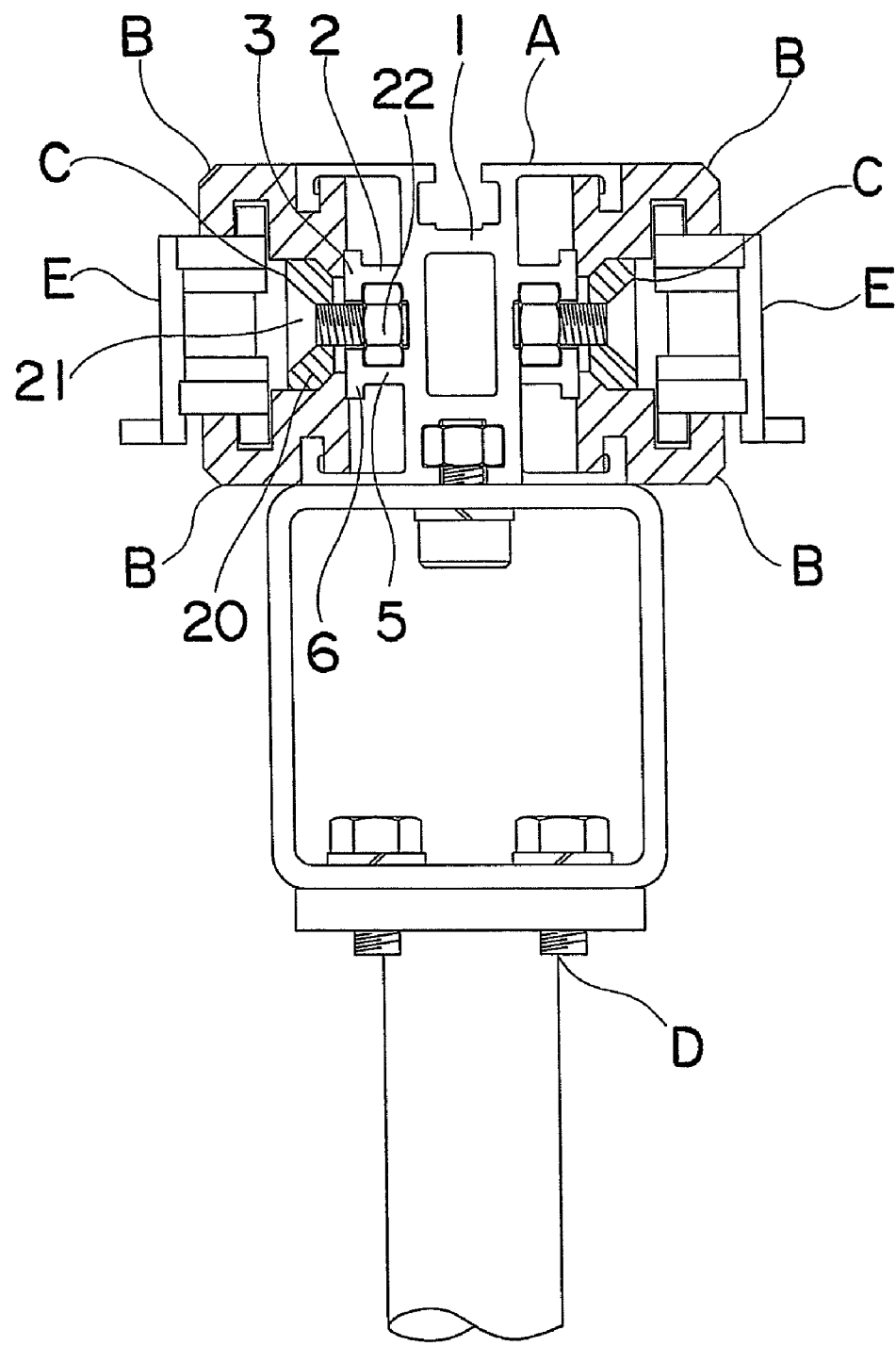
FIG. 9 is a partially cut-away front view of another embodiment of the conveyor-track frame assembly according to the present invention.
Figure 10:
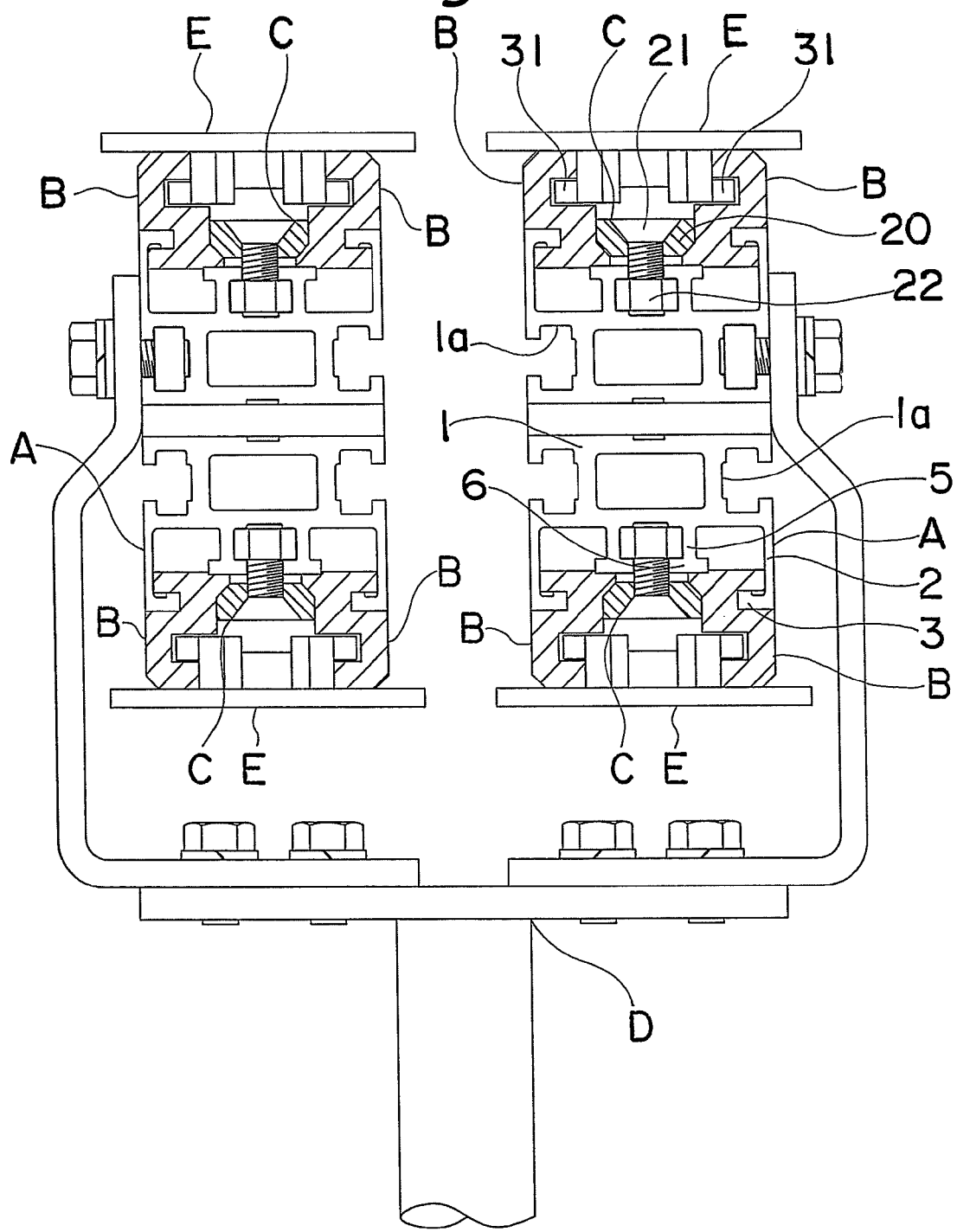
FIG. 10 is a partially cut-away front view of another embodiment of the conveyor-track frame assembly according to the present invention.
Figure 11:
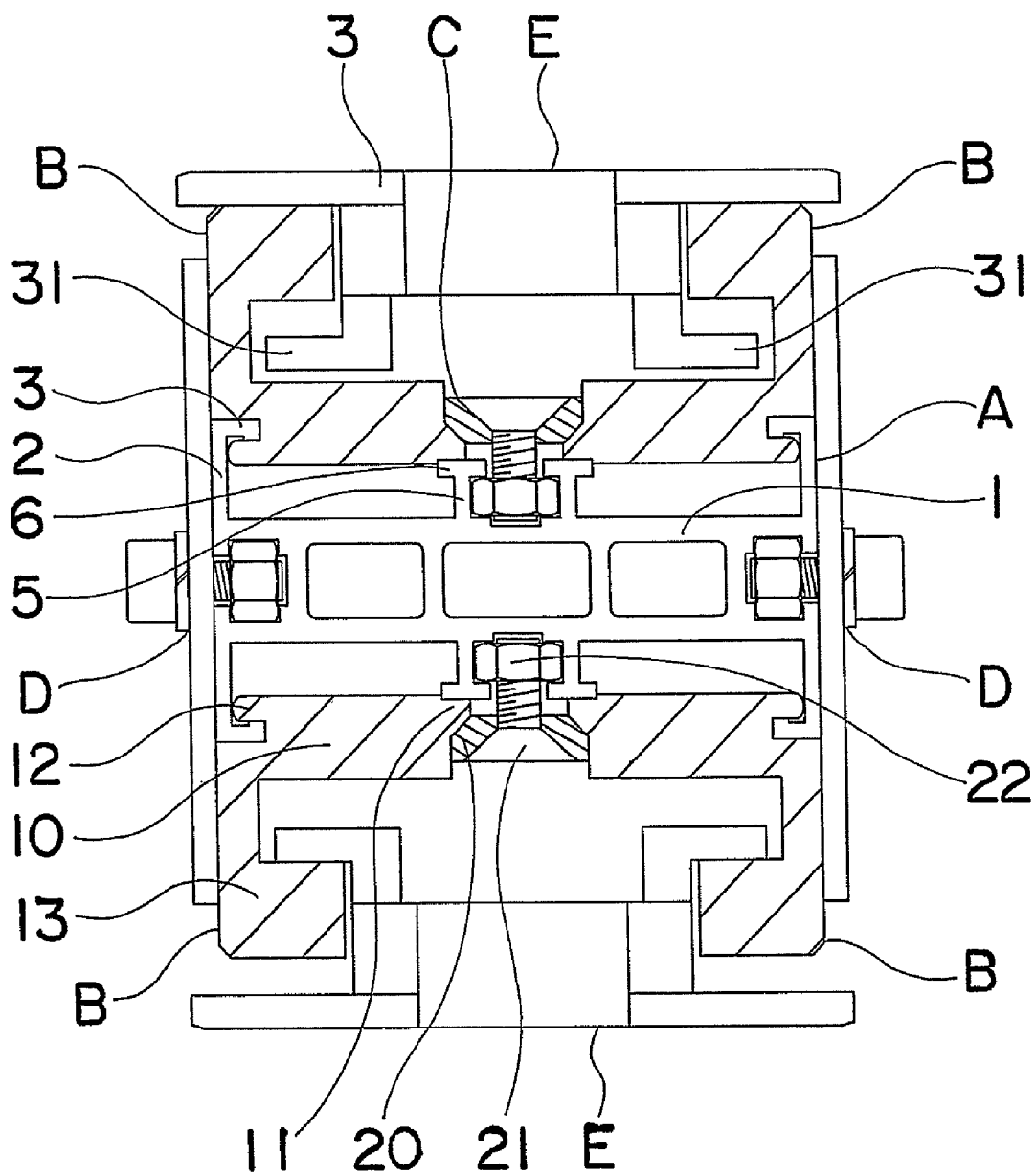
FIG. 11 is a partially cut-away front view of another embodiment of the conveyor-track frame assembly according to the present invention.

Note here that as shown in FIGS. 2, 3, 4, 8, 9 and 15, for example, the conveyor chain E may have a structure including chain elements 30, engaging projections 31 provided at the rear top and bottom, respectively, of each chain element 30 and a hanging projection provided at the front bottom of each chain element 30 and on which a plastic bottle can be hung for conveyance. Also, as shown in FIGS. 5, 10 and 11, the conveyor chain E may have such a structure including plate-shaped chain elements 30 and engaging projections 31 provided at the bottom right and left, respectively, of each chain element 30 that an object to be placed on the upper surface of the chain element 30 for conveyance. As shown in FIGS. 12 and 13, the conveyor chain E may have such a structure including chain elements 30, engaging projections 31 provided on the rear top and bottom of each chain element 30 and an elastic to-be-compressed piece provided at the front of the chain element 30 that an object can be conveyed while being pressed and held by the right and left to-be-compressed pieces. Otherwise, the conveyor chain E may have such a structure including plate-shaped chain elements 30, engaging projections 31 provided at the bottom right and left, respectively, of each chain element 30 and a plurality of rollers is provided at the tops of the elements 30 that an object placed on the rollers can be conveyed, as shown in FIG. 14. Another appropriate means may freely be selected to support the frame member A.

The track frame assembly according to the present invention can be used to build a conveyor system including two such track frame assemblies and two conveyor chains each traveling along the side of each track frame assembly to convey objects by hanging or a conveyor system including a single such track frame assembly and a conveyor chain traveling on the track frame assembly to convey objects by having the latter onboard. Even in case the conveyor system is built of the single track frame assembly, it may be designed to provide two separate tracks opposite in direction.

The invention claimed is:

1. A track frame assembly compatible with a conveyor chain, having chain elements, to guide the conveyor chain stably, the assembly comprising:
    an elongated frame member having a predetermined surface;
    at least a pair of elongated track rail members each fixed in place on the predetermined surface of the frame member; and a plurality of rail fixtures, having central axes, with which the pair of track rail members can removably be fixed to the frame member, each of the track rail members including a retaining projection having a retaining recess formed therein;

the pair of track rail members being arranged such that the retaining recesses are opposite to each other with respect to a central axis of a corresponding rail fixture; and each chain element of the conveyor chain having a pair of engaging projections which are formed to slide in contact within corresponding retaining recesses of the pair of track rail members such that the conveyor chain is smoothly movable without disengagement from the pair of track rail members;

the frame member including a frame body portion, at least a pair of outer projections formed on the frame body portion, and a pair of inner projections formed between the pair of outer projections;

each track rail member including a track rail body portion, a base portion having a base end, a wedging projection formed inside the base end of the base portion and having a slanted face, an engaging projection formed outside the base end of the base portion, and the retaining projection formed outside an outer end of the base portion to have a generally C-shaped cross-section; and each of the rail fixtures is provided between a corresponding pair of track rail members to prevent the pair of track rail members from moving toward each other, and each of the rail fixtures including a fixing plate having a pair of slanted faces which are in close contact with corresponding slanted faces of the wedging projections of the track rail members;

a bolt having an end inserted in a bolt hole formed in the fixing plate; and a nut received in a nut receiving recess defined between the pair of inner projections and in which the end portion of the bolt is driven, when the fixing plate is moved to the frame body portion by tightening the bolt, the pair of slanted faces of the fixing plate presses the corresponding slanted faces of the wedging projections of the track rail members, and the track rail members being pressed to the frame body portion and the pair of outer projections of the frame member.

2. The track frame assembly according to claim 1, wherein the frame member has formed therein a fixing concavity in which a supporting member can be fixed and an appropriate lightening cavity.

3. The track frame assembly according to claim 1, wherein the frame members are metallic and formed by extrusion molding, and the track rail members are made of a synthetic resin.

4. A track frame assembly compatible with a conveyor chain, having chain elements, to guide the conveyor chain stably, the assembly comprising:

an elongated frame member having a predetermined surface;

at least a pair of elongated track rail members each fixed in place on the predetermined surface of the frame member; and a plurality of rail fixtures, having central axes, with which the pair of track rail members can removably be fixed to the frame member, each of the track rail members including a retaining projection having a retaining recess formed therein;

the pair of track rail members being arranged such that the retaining recesses are opposite to each other with respect to a central axis of a corresponding rail fixture; and each chain element of the conveyor chain having a pair of engaging projections which are formed to slide in contact within corresponding retaining recesses of the pair of track rail members such that the conveyor chain is smoothly movable without disengagement from the pair of track rail member;

the frame member including a frame body portion having at least a flat surface provided with outer ends, a pair of outer projections formed on the flat surface of the frame body portion at outer ends of the frame body portion to have a generally L-shaped cross section and a pair of inner projections formed inside the outer projections on the flat surface of the frame body portion to have a generally T-shaped cross section;

each track rail member including a track rail body portion that abuts a part of the outer projection of the frame member, a base portion having a base end, a wedging projection formed inside the base end of the base portion to abut a part of the inner projection and having a slanted face, an engaging projection formed outside the base end of the base portion to abut a part of the outer projection, the retaining projection formed outside an outer end of the base portion to have a generally C-shaped cross section and abut a part of the outer projection, and an engaging step which is in contact with and engaged on the corner, at the outer end, of the inner projection;

each of the rail fixtures is provided between a corresponding pair track rail members to prevent the pair of track rail members from moving toward each other, and each of the rail fixtures including a fixing plate having a pair of slanted faces which are in close contact with corresponding slanted faces of the wedging projections of the track rail members, a bolt having an end inserted in a bolt hole formed in the fixing plate, and a nut to be received in a nut receiving recess defined between the pair of inner projections and in which the end portion of the bolt is driven, when the fixing plate is moved to the frame body portion of the frame member by tightening the bolt, the pair of slanted faces of the fixing plate presses the corresponding slanted faces of the wedging projections of the track rail members and the pair of track rail members being pressed to the frame body portion and the pair of outer projections of the frame member.

5. The track frame assembly according to claim 4, wherein the frame member has formed therein a fixing concavity in which a supporting member can be fixed and an appropriate lightening cavity.

6. The track frame assembly according to claim 4, wherein the frame members are metallic and formed by extrusion molding, and the track rail members are made of a synthetic resin.

* * * * *